A. SERIN.
Eye-Glasses.
No. 148,147. Patented March 3, 1874.
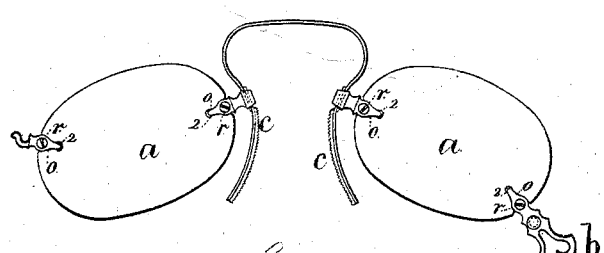
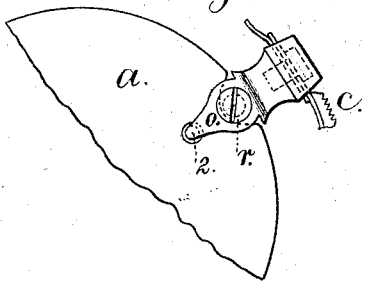
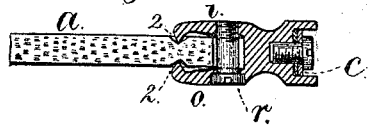
Witnesses
Chas. H. Smith
Geo. T. Pinckney
Inventor
Auguste Serin
per Lemuel W. Serrell
Atty.

UNITED STATES PATENT OFFICE

AUGUSTE SERIN, OF NEW YORK, N. Y.

IMPROVEMENT IN EYEGLASSES.

Specification forming part of Letters Patent No. 148,147, dated March 3, 1874; application filed February 3, 1874.

*To all whom it may concern:*

Be it known that I, AUGUSTE SERIN, of the city and State of New York, have invented an Improvement in Spectacles and Eyeglasses, of which the following is a specification:

The glasses of spectacles and eyeglasses are usually received into a metal frame, but in some instances the frame has been dispensed with, and the handle, spring, bows, or other connecting devices, have been attached directly to the glass by means of screws passing through holes in the glass and uniting thereto the metallic clip connections. In this mode of construction, the glass is so much weakened, by the hole passing through the same, as to be easily broken.

My invention is made for obviating the danger of breakage, and consists in a clip with inward projections upon the ends that enter cavities in the glass and firmly hold the same, and to these clips the handle, bow, springs, or other parts of the spectacle are attached.

In the drawing, Figure 1 shows an ordinary character of spectacle. Fig. 2 is an elevation, and Fig. 3 a section in larger size, of the clip separately.

The glasses $a$, loop or handle $b$, spring $c$ or nose-clip, are of usual character. The clip connections to the glass are all of the character shown in Figs. 2 and 3, the arms $i$ $o$ having projections 2 at their inner ends; and these arms $i$ $o$ are made together or united outside the edge of the glass. There are cavities provided in the surfaces of the glasses $a$ for receiving the projections 2, and the screws $r$ draw the arms $i$ and $o$ together, and firmly clamp the glass, and with little or no risk of breaking the same.

I claim as my invention—

The projections 2 at the ends of the arms $i$ $o$, entering cavities in the glass, and forming metallic clips for connecting the glass to the other parts of the spectacle or eyeglass, substantially as set forth.

Signed by me this 30th day of January, A. D. 1874.

AUGUSTE SERIN.

Witnesses:
GEO. T. PINCKNEY,
CHAS. H. SMITH.